April 18, 1961   C. J. SCRANTON   2,979,877
CORN HARVESTER AND THRESHING UNIT THEREFOR
Filed Aug. 26, 1958   4 Sheets-Sheet 1

Inventor
Charles J. Scranton
by
Attorney

April 18, 1961 C. J. SCRANTON 2,979,877
CORN HARVESTER AND THRESHING UNIT THEREFOR
Filed Aug. 26, 1958 4 Sheets-Sheet 2

April 18, 1961

C. J. SCRANTON 2,979,877

CORN HARVESTER AND THRESHING UNIT THEREFOR

Filed Aug. 26, 1958

Inventor
Charles J. Scranton
By Robert W. Laktinen
Attorney

April 18, 1961  C. J. SCRANTON  2,979,877
CORN HARVESTER AND THRESHING UNIT THEREFOR
Filed Aug. 26, 1958  4 Sheets-Sheet 4

Inventor
Charles J. Scranton
by Basil W. Lahtinen
Attorney

United States Patent Office 2,979,877
Patented Apr. 18, 1961

2,979,877
CORN HARVESTER AND THRESHING UNIT THEREFOR

Charles J. Scranton, La Porte, Ind., assignor to Allis-Chalmers Manufacturing Company, Milwaukee, Wis.

Filed Aug. 26, 1958, Ser. No. 757,414

4 Claims. (Cl. 56—18)

This invention relates to harvesting machines and more particularly to corn harvesting and shelling apparatus also known as a corn combine.

To utilize a conventional combine harvester to pick and shell corn it is necessary to adapt a corn picking unit to substitute for the header commonly used with the harvester base in conjunction with grain crops. A principal part of this adaptation is the provision of a suitable conveying system between the terminal portions of the picker gathering mechanisms and the threshing cylinder of the combine to provide an even flow of harvested material and minimize the weight of the structure that must be attached to the base unit of the combine.

It is a general object of this invention to provide an improved harvesting machine for use in row crops such as corn.

More particularly, it is an object of the invention to provide an improved corn combine wherein a corn picking unit for adaptation to a base harvester unit has a minimum of weight; requires the addition of a minimum of extra support members to the base harvester unit; and delivers the gathered materials to the threshing unit in as even and regular a manner as possible.

The invention contemplates the use of a conveying system having two conveying stages to reduce the size and weight of the conveyer structure and as a consequence minimizes the use of additional structural supports for the corn picking unit on the base harvester unit. This conveying system utilizes an auger type transverse conveyer to take the harvested ears from the gathering chains of the individual units of the pickers proper to a common location where radial vanes or beaters located on the drum of the auger afford a positive loading action disposing the harvested material on a continuous conveyer that transports the material to the threshing cylinder.

A further object is to provide a corn combine of the hereinabove outlined character wherein the delivery of conveyed material will not be impaired by a recycling of material or a clogging of the conveying system by a failure of the material to be engaged by the conveying elements.

Other objects and advantages will become apparent from the following detailed description of a preferred embodiment illustrated in the accompanying drawings, in which:

Fig. 1 is a partial plan view of a corn combine embodying the invention, a two row corn head being shown with the left hand outer gathering point, and portions of the gathering sheet assemblies, snapping roll cover and hopper assembly broken away to expose parts of the left picking mechanism. For purposes of simplification, the rear portion of the base harvester unit, which is of conventional construction, has also been omitted;

Figure 1:
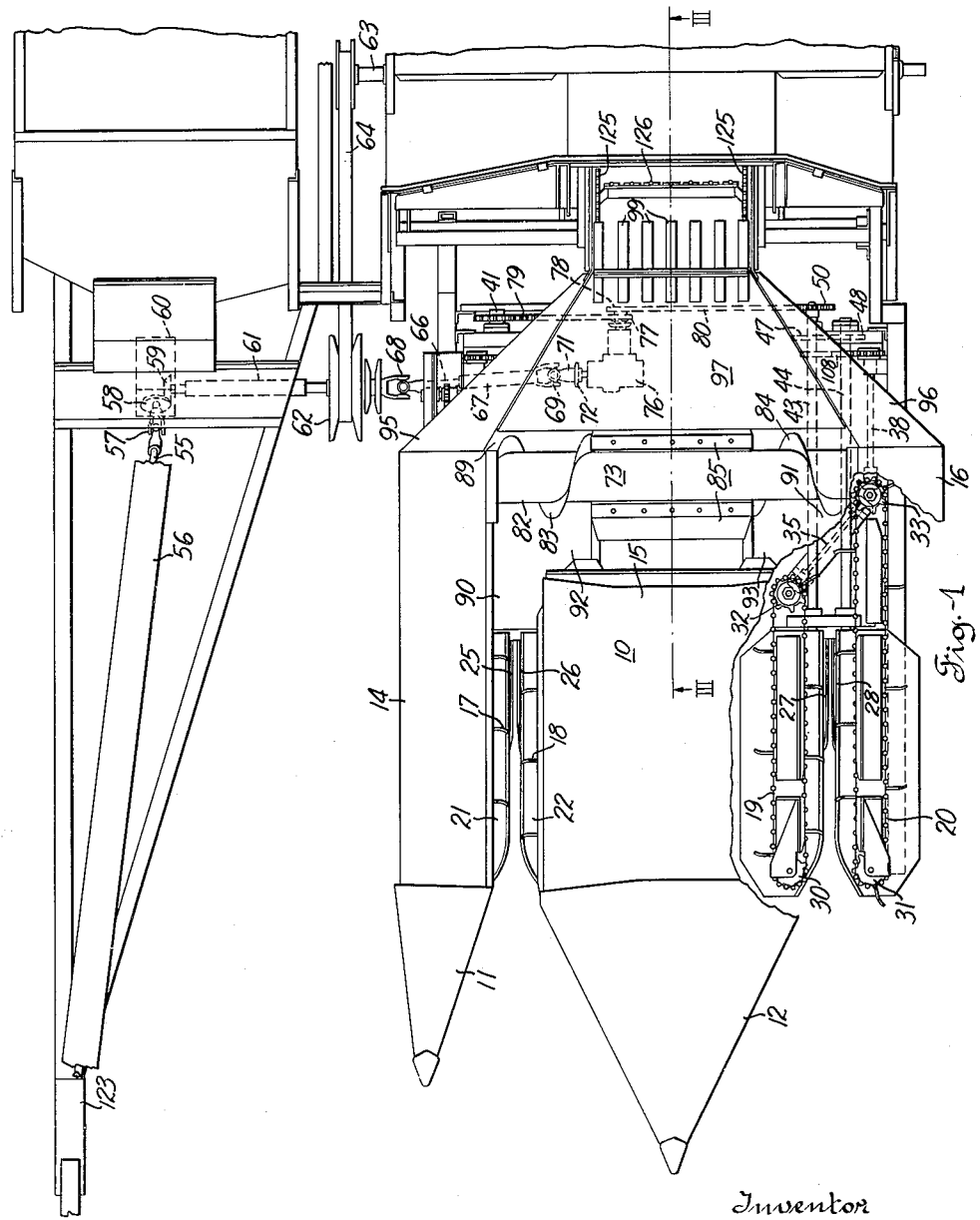

Referring to Fig. 1 the right hand picking unit of the corn head 10 is shown with a conventional picking mechanism including divider points 11 and 12 with gathering sheets 14 and 15 to the rear thereof. Between the shield portions are gathering chains 17 and 18, stripper plates 21 and 22 and snapping rolls 25 and 26. The left hand picking unit is shown with the housing broken away to indicate the gathering chains 19 and 20 passing about the idler sprockets 30 and 31 at the front and the drive sprockets 32 and 33 in the rear which are connected positively by the gather drive cross shaft 35. The sprocket 33 is driven by the driven sprocket shaft 38.

The snapping rolls 27 and 28 are secured to the roll shafts 43 and 44 and the shafts have mounted thereon roll gears 47 and 48 which provide a positive rotational relation between the snap rolls 27 and 28. The long roll shaft 43 is power driven through the snap roll sprocket 50.

Power from a tractor power take-off (not shown) is applied to a line shaft 55 which is concealed by a shield 56 shown broken away at its ends. Power is transmitted through a universal joint 57, bevel gears 58 and 59 in a gear box 60, and through a shaft 61 on which is mounted a cylinder drive sheave 62. Power to drive the threshing cylinder which is mounted on the shaft 63 is supplied by the belt 64.

Power is transmitted to the corn head by telescopic shafting 66, 67 and associated universal joints 68 and 69 at its opposite ends. The yoke 71 has a sprocket 72 attached thereto from which power is taken for driving the auger 73 and the endless raddle type elevating conveyer 74. The balance of the power to the corn head is transmitted through the gear box 76 to the sprockets 77 and 78 which drive the long roll shafts 41 and 43 of the right and left hand snapping rolls 25 and 27 through the chains 79 and 80, respectively.

The auger 73 is composed of a drum 82 on the end portions of which are mounted opposed helical vanes 83 and 84 with a central portion having radial vanes, paddles or beaters 85 which form a packing portion for the effective transfer of material from the auger conveyer 73 to the endless elevating conveyer 74. The illustrated construction shows the helical vanes 83 and 84 terminating in the radial vanes 85. The radial vanes, paddles, or beaters are composed of a metal feeder paddle base portion 86 to which is secured the flexible paddle, vane or beater portion 87. The auger is suitably journaled to the outer gathering shield assemblies 14 and 16 with drive means provided from the right side by a chain 146 (Fig. 4) and sprocket 149, as will be explained more fully hereinbelow.

At the rear of the stripper plates 21 and 22 as visible on the right hand picker unit of Fig. 1 is a hopper structure 89 formed of a snapping roll cover 90 to the rear of which is a trough 92 which slopes downward toward the center of the corn head at the rear of the center gathering sheet assembly 15 and is disposed beneath the helical portion 83 of the auger 73. A similar structure exists in the left hand portion of the hopper assembly formed of snapping roll cover 91 and trough 93.

The auger 73 is rotated urging the harvested material through the trough transversely to the central packing portion having radial vanes 85. The radial vanes 85 force the transferred harvested material down onto the endless raddle type elevating conveyer 74 which extends from below the radially vane packing portion of the auger 73 upwardly and rearwardly.

Between the hopper side members 95 and 96 is a shield 97 which has a forward edge 98 disposed in stripping relation to the radial vanes 85 to resist recycling of the harvested material about the auger drum preventing accumulation of material and clogging of the unit. The shield extends upwardly and rearwardly above the raddle conveyer 74 and terminates at its rearward end in a series of laterally spaced hold down fingers 99 which allow the operator to view conditions at the upper portion of the elevating raddle conveyer 74 during operation.

Figure 2:
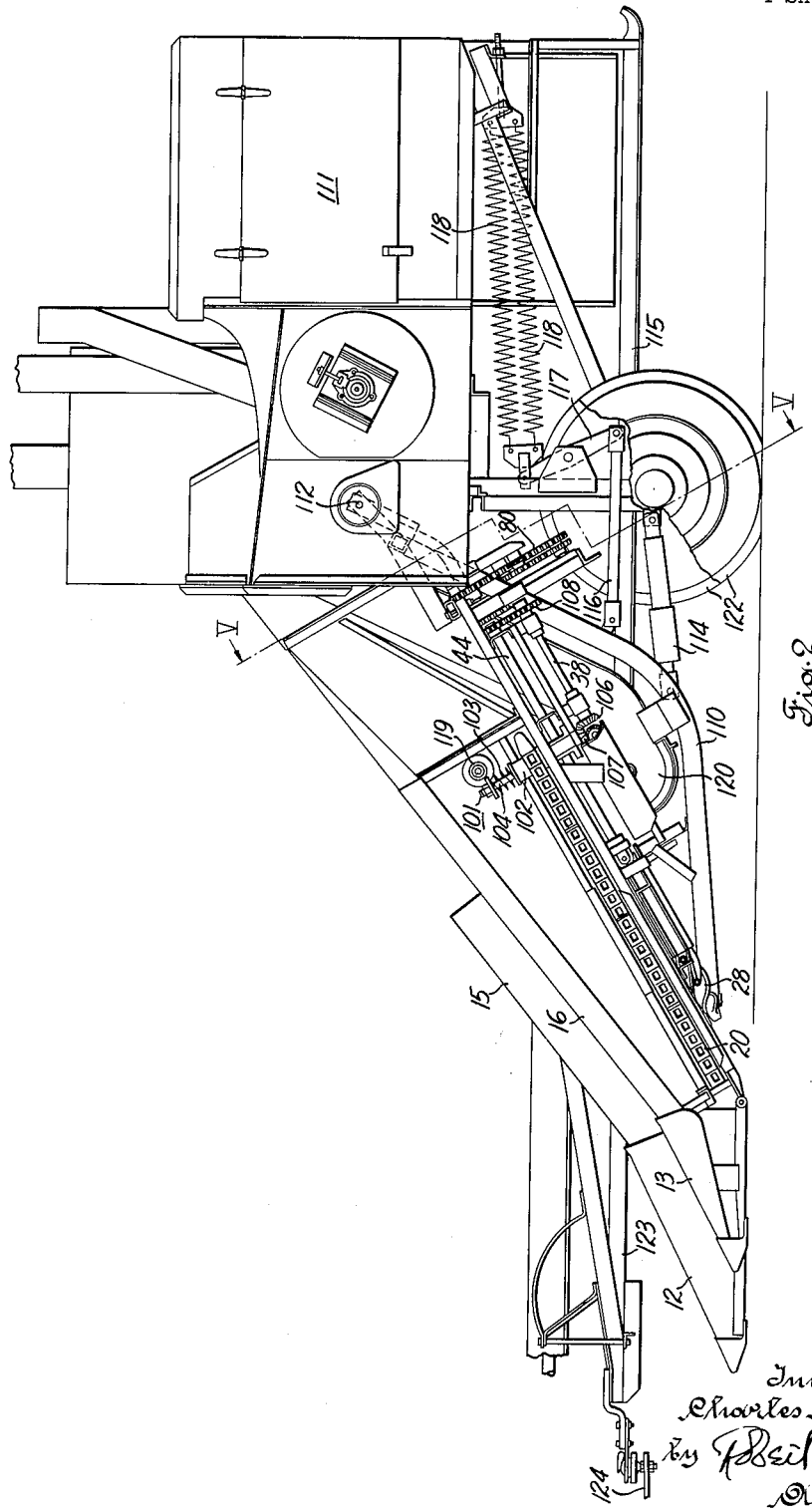
Fig. 2 is a left side elevation of the corn combine partly shown in Fig. 1, a supporting wheel at the left side of the machine being partly broken away.

Fig. 2 shows a left side elevation of the combined corn head and base unit. The left hand picking unit of the corn head assembly is shown with the left hand point divider 13 mounted forward of the left hand outer gathering sheet assembly 16 and the center divider point assembly 12 mounted at the forward end of the center gathering sheet assembly 15. Beneath the outer gathering sheet assembly 16 is shown the outer left hand gathering chain 20. At the rear of the gathering chain 20 is the gathering chain drive assembly 101 including the slip clutch 102, the slip clutch spring 103, the slip clutch shaft 104 and the drive sprocket 33. The slip clutch shaft 104 is supplied with power through the bevel gears 106 and 107 and is ultimately connected through the driven sprocket shaft 38, and the chain 108 to the inner or long roll shaft 43. The snap roll 28 is connected to the outer or short roll shaft 44 which in turn receives power from the long roll shaft 43 through a pair of intermeshing spur gears 47 and 48.

The corn head is supported by the main corn head frame 110 which is pivotally connected to the base unit 111 by a pair of axially aligned pins 112. The elevation of the corn head is controlled by the remote ram 114 which is pivotally connected to the corn head main frame 110 at its forward end and to the base harvester or threshing unit frame 115 at its rearward end. Also pivotally connected to the main frame of the corn head is a balance rod 116 which in turn is pivotally connected to a swingable arm 117 on the main frame 115 of the base unit. A set of counterbalance springs 118 reacts between the arm 117 and the main frame 115 to exert a lifting moment upon the corn head.

The position of the auger conveyer is indicated in Fig. 2 by the end portion of the bearing and collar assembly 119 below which can be seen the raddle conveyer housing 120.

The combine is supported by a pair of axially aligned ground engaging wheels 122 and by the draft connection between the tongue assembly 123 and the draft vehicle drawbar 124, as shown in Fig. 2.

Figure 3:
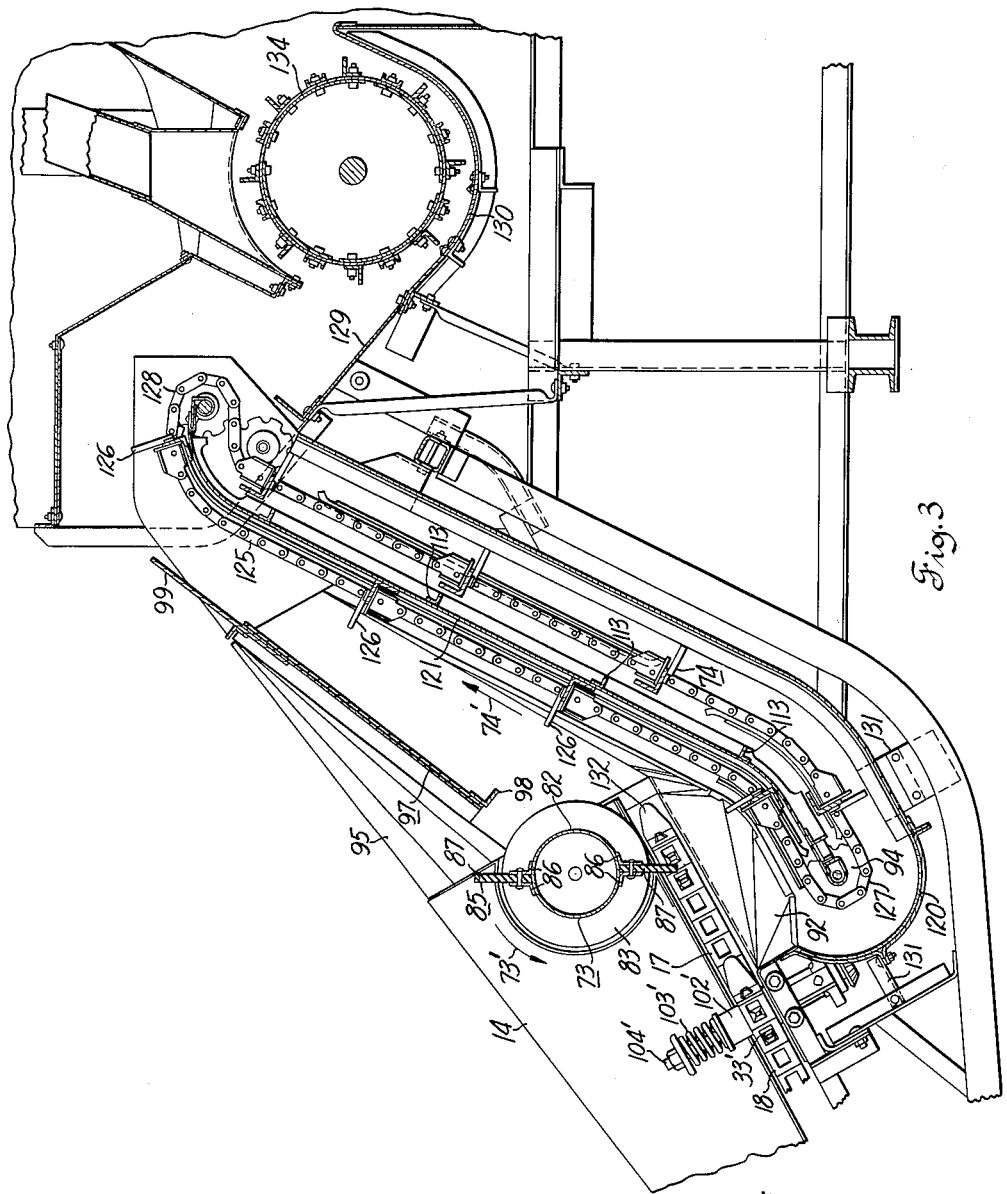
Fig. 3 is a section view showing the multiple conveyer system of the machine taken along line III—III of Fig. 1.

Fig. 3 is a section view taken on the center line of the corn head and shows, at the left of the figure, the rearward portions of the right hand gathering chains 17, 18 and, at the right, the threshing cylinder 134 of the base unit. The slip clutch shaft 104', slip clutch 102', slip clutch spring 103', and drive sprocket 33' on the inner right hand gathering chain 18 are shown just forward of the trough structure 92 beneath the auger 73. Beyond can be seen the outer right hand gathering chain 17 with its driving mechanism concealed by the outer gathering sheet assembly 14.

The chain 125 and carrying flights 126 of the raddle conveyer are shown and include the arcuate portions 127 and 128 of the raddle conveyer at either end thereof, one arcuate portion 127 extends below the radial vanes of the central packing portion of the auger conveyer 73 and the other arcuate section 128 terminates over the feed table 129 which leads by gravity into the threshing chamber 130. A stationary cross wall 121 is positioned within the loop defined by the raddle chains 125 and extends beneath the raddle chains 125 and raddle flights 126 in the riser portion of the conveyer 74. The cross wall 121 is secured at its sides to the elevator housing 120 and is supported by the angle cross members 113.

The raddle is driven by the drive sprocket 141 (Fig. 4) which is on a common shaft with the sprockets 94 which engage the raddle chains 125. The width of the raddle elevating conveyer 74 is indicated in Fig. 1 by the chains 125 and the cross flights 126 which move upward over the cross wall 121. The width of the elevator conveyer 74 is approximately coextensive with the length of the radially vaned or beater portion of the auger 73. Above the endless raddle elevating conveyer 74 and running longitudinally with respect to the raddle conveyer 74 is the shield 97 with the hold down fingers 99 at its upper extremity and the stripping edge 98 at its lower terminus. Beneath the raddle type elevating conveyer 74 is an elevator housing or trough 120 which extends from the lower rearward end of the center gathering sheet assembly 15 upwardly and rearwardly to the feed table leading to the threshing chamber 130. This housing or trough 120 is joined from either side by the trough structures 92 and 93 beneath the helical portions 83 and 84 of the auger 73. This elevator housing at the balance of its sides joins the hopper sides 95 and 96. The elevator housing is secured to the main frame of the corn head by suitable bracket mountings 131.

In operation, the harvested material that is removed from the standing crop by the action of the snapping rolls and the stripper plates, such as the ears of corn and the leaves and other materials associated therewith, are induced to move rearward over the snapping roll covers 90 and 91 by the action of the gathering chains. The material travels into the trough beneath the auger whereupon the helical vanes 83 and 84 of the auger 73 transversely convey the harvested material centrally from the two picking units through the trough onto the raddle type elevating conveyer 74. The raddle conveyer is of the overshot type with motion in the direction shown by the arrow 74'. The auger 73 moves counterclockwise in the direction indicated by the arrow 73' and serves initially to divert from the fingers 132 of the gathering chain 17 material that tends to adhere; then to direct the harvested material through the trough structure beneath the helical portions and onto the endless raddle conveyer that underlies the central radially vaned packing portion of the auger drum 82. The flexible vanes or beaters 85 mounted upon the central drum section of the auger 73 serve to pack the harvested material against the upgoing stretch of raddle conveyer 74 and thereby effect a positive loading action of the elevating conveyer. The stripping edge 98 of the shield 97 cooperates to clear the radial vanes 85 of any harvested material that might tend to accumulate at the initial portion of the elevating conveyer thereby preventing the recycling and accumulation of harvested material and clogging of the mechanism at this point. The shield 97 tends to hold the harvested material against the raddle conveyer so that the flights 126 thereon can effectively keep the harvested material moving up the conveyer during a period when large quantities of material are passing through the conveyer system. The series of transversely spaced hold down fingers 99 that form the upper terminal portion of the shield 97 afford the operator a view of the conditions prevailing at the upper portion of the conveyer and the quantity of material being delivered to the threshing cylinder 134.

Figure 4:
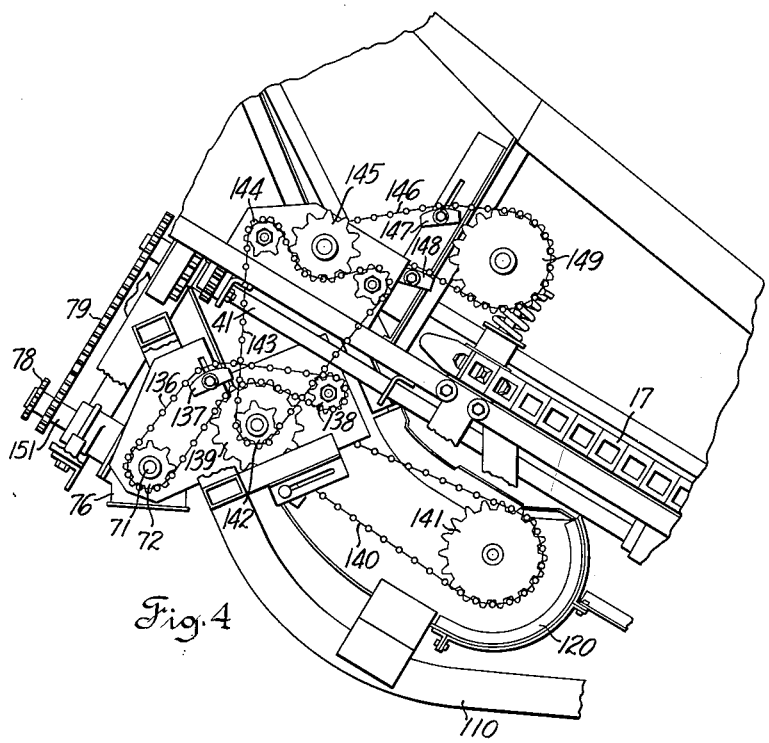
Fig. 4 is an enlarged cut away view of part of the right side of the corn head showing details of the drive mechanism for the picking units and conveyers.

Fig. 4 is a view from the right side of the corn head showing the roller chain drives. The chain 136 is driven by the sprocket 72 which is associated with the yoke portion of the universal joint 71 (Fig. 1) at the gear box 76. Chain 136 moves from the sprocket 72 over the idler block 137 around the idler sprocket 138 and over the drive sprocket 139. The drive sprocket 139 is rigidly associated with another sprocket over which a chain 140 passes, which in turn drives the elevator conveyer shaft driven sprocket 141. Also ridigly associated on the same shaft as drive sprocket 139 is a third sprocket 142 which drives chain 143 which passes over idlers 144 and drives the drive sprocket 145. The drive sprocket 145 is rigidly secured to the same shaft with a feeder drive sprocket which engages chain 146 which in turn passes over the guide blocks 147 and 148 and drives the auger drive sprocket 149.

The gear box 76 contains bevel gears which transmit power from shaft 71 to shaft 151 from which the chain 79 and the associated sprockets deliver power to the roll shaft 41. The chain 80 (Fig. 5) driving the roll shaft 43 of the left hand picking unit takes power from the sprocket 78.

Figure 5:
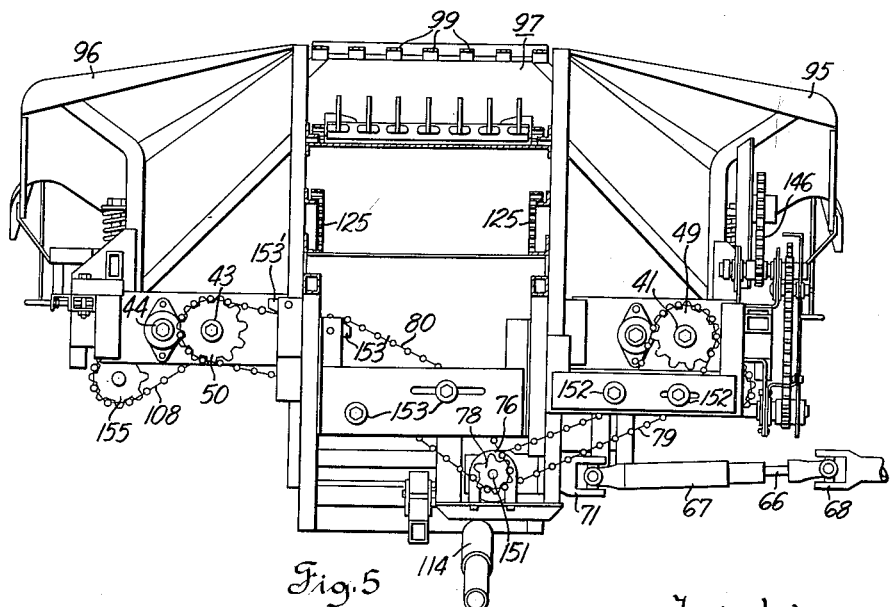
Fig. 5 is a section view taken along line V—V of Fig. 2 showing further details of the drive mechanism for the picking units and conveyers.

Fig. 5 shows the power transmitting mechanism between the gear box 76 and the long roll shafts 41 and 43 of the right hand and left hand pickers. The right hand picking unit is driven by a chain 79 which passes over a sprocket on shaft 151, idlers 152 and the sprocket 49 which is rigidly associated with the roll shaft 41. Similarly, the left hand picking unit is driven by chain 80 which takes power from sprockets 78 and passes over idlers 153 and guide blocks 153' and delivers power to the roll shaft 43 of the left hand picking unit through sprocket 50. Chain 108 delivers power from the roll shaft 43 to the driven sprocket 155 supplying power to drive both of the gathering chains of the left hand picking unit.

In operation, the stalks of corn pass between the stripper plates and the snapping rolls whereupon the ears are severed from the stalks in the conventional manner. The gathering chains carry the harvested material rearward over the snapping roll cover plates 90 and 91 to the trough sections 92 and 93. As the outer gathering chain passes beneath the helical vanes of the auger any material that may have adhered thereto is finally stripped off and dropped in the trough portions 92 and 93 beneath the auger 73. The helical sections of the auger urge the harvested material toward the central portion where the lower arcuate portion 127 of the raddle conveyer 74 underlies the radial vaned portion of the auger 73. The radial vanes 85 of the central packing portion of the auger tend to beat or pack the harvested material securely down against the endless raddle conveyer 74 allowing the flights 126 to positively engage the material and effect a conveyance of the harvested material upward to be discharged into the threshing compartment 130. Further, as the auger 73 turns the radial vanes 85 are stripped of harvested material which may tend to adhere thereto by the lower stripping edge 98 of the shield 97 to prevent the possibility of materials remaining at the inlet end of the raddle conveyer 74 which might cause a clogging of the conveyer system at this point. The shield further serves to depress the harvested material against the flights 126 of the raddle conveyer 74 as it travels upward during periods when large amounts of the harvested material are being conveyed.

It is not intended to limit the invention to the exact construction herein shown and described for purposes of illustration, as various modifications within the scope of the appended claims may occur to persons skilled in the art.

What is claimed is:

1. A corn head for mounting on a harvester thresher in lieu of its grain head, said corn head comprising a frame structure having attaching means for connection with the body structure of said harvester thresher; a housing structure mounted on said frame structure and defining a pair of transversely spaced fore and aft passageways; ear picking and conveying means mounted on transversely spaced portions of said frame structure and associated, respectively, with said passageways so as to deliver picked ears at the rear ends thereof; an auger conveyer rotatably mounted on said frame structure on a transverse axis with opposed helical vane portions disposed respectively rearward of said passageways in picked ear receiving relation thereto; a coaxial radial vane portion disposed between said helical vane portions for rotation in unison therewith; an endless conveyer element operatively mounted on said frame structure and having a lower end portion underlying said radial vane portion and a riser section extending upwardly and rearwardly for positioning in material delivering relation to the threshing mechanism of said harvester-thresher; power transmitting means operable to rotate said auger conveyer and to move said conveying element in such directions that the vanes of said radial vane section will pass over the underlying portion of said conveying element in the direction of movement of the latter; and a shield disposed in upwardly and rearwardly extending relation above said conveying element and having a lower edge in stripping relation to said radial vane section.

2. A corn head for mounting on a harvester thresher in lieu of its grain head, said corn head comprising a frame structure having attaching means for connection with the body structure of said harvester thresher; a housing structure mounted on said frame structure and defining a pair of transversely spaced fore and aft passageways; ear picking and conveying means mounted on transversely spaced portions of said frame structure and associated, respectively, with said passageways so as to deliver picked ears at the rear ends thereof; an auger conveyer rotatably mounted on said frame structure on a transverse axis with opposed helical vane portions disposed respectively rearward of said passageways in picked ear receiving relation thereto; a central radial vane portion disposed between and rotatable in unison with said helical vane sections; an endless overshot raddle conveyer supported by said frame structure and presenting an arcuately concave upwardly facing lower end portion disposed below said radial vane portion and a riser section extending upwardly and rearwardly with the rearward terminal portion in material delivering relation to the threshing mechanism of said harvester thresher; power transmitting means operable to rotate said auger in such direction that the vanes of said radial vane portion will pass over the adjacent portion of said raddle conveyer in the direction of movement of the latter; and a shield disposed in spaced relation above said endless conveyer extending upwardly and rearwardly from a location proximate to the radial extremities of said radial vane portion.

3. A corn head as in claim 2 wherein said shield is disposed in upwardly and rearwardly converging spaced relation above said endless raddle conveyer with a lower edge in stripping relation to said central radial vane portion.

4. A corn head for mounting on a harvester thresher in lieu of its grain head, said corn head comprising a frame structure having attaching means for connection with the body structure of said harvester thresher; a housing structure mounted on said frame structure and defining a pair of transversely spaced fore and aft passageways; ear picking and conveying means mounted on transversely spaced portions of said frame structure and associated, respectively, with said passageways so as to deliver picked ears at the rear ends thereof, a pair of ear conveying helical vanes operatively mounted, respectively, in rear of said passageways for rotation on a transverse, horizontal axis and separated from each other by an intermediate axial space, an ear elevating conveyer having a lower ear receiving portion extending forwardly under said axial space between said helical vanes, and an upper portion in ear delivering relation to the threshing mechanism of said harvester thresher, radial paddle means mounted between said helical vanes for rotation in unison therewith and in overlying relation to said ear receiving portion of said elevating conveyer, said helical vanes being oppositely pitched so that rotation thereof in unison with said paddle means will cause axial inward movement of picked ears by said helical vanes toward said paddle means and general rearward movement of picked ears below said axis by said paddle means; and a shield disposed in upwardly and rearwardly extending relation above said ear elevating conveyer and having a lower edge in stripping relation to said paddle means.

References Cited in the file of this patent

UNITED STATES PATENTS

| | | |
|---|---|---|
| 2,371,822 | Hyman | Mar. 20, 1945 |
| 2,398,028 | Mitchell | Apr. 9, 1946 |
| 2,679,921 | Best | June 1, 1954 |
| 2,755,912 | Ashton | July 24, 1956 |
| 2,833,287 | Sammarco et al. | May 6, 1958 |